(12) United States Patent
Matsuoka et al.

(10) Patent No.: US 8,070,304 B2
(45) Date of Patent: Dec. 6, 2011

(54) CAMERA LENS UNIT

(75) Inventors: Kouichiro Matsuoka, Kyoto (JP);
Nobuo Yamashita, Kyoto (JP);
Hirohiko Ina, Hyogo (JP); Nami Nagamori, Osaka (JP); Masatoshi Yamashita, Osaka (JP)

(73) Assignee: Panasonic Corporation, Osaka (JP)

( * ) Notice: Subject to any disclaimer, the term of this patent is extended or adjusted under 35 U.S.C. 154(b) by 363 days.

(21) Appl. No.: 11/813,462

(22) PCT Filed: Jan. 13, 2006

(86) PCT No.: PCT/JP2006/300345
§ 371 (c)(1),
(2), (4) Date: Jul. 6, 2007

(87) PCT Pub. No.: WO2006/075686
PCT Pub. Date: Jul. 20, 2006

(65) Prior Publication Data
US 2009/0310223 A1   Dec. 17, 2009

(30) Foreign Application Priority Data

Jan. 17, 2005   (JP) ................................. 2005-008823

(51) Int. Cl.
*G02B 27/00* (2006.01)
(52) U.S. Cl. ........................................ 359/601; 359/738
(58) Field of Classification Search ........................ None
See application file for complete search history.

(56) References Cited

U.S. PATENT DOCUMENTS

| 4,662,717 | A | 5/1987 | Yamada et al. |
| 6,804,061 | B2 | 10/2004 | Nemoto et al. |
| 2002/0131782 | A1* | 9/2002 | Yamaguchi et al. .......... 396/429 |

FOREIGN PATENT DOCUMENTS

| JP | 60-64316 A | 4/1985 |
| JP | 2002-228909 A | 8/2002 |
| JP | 2002-311319 | 10/2002 |
| JP | 2003-337206 A | 11/2003 |
| JP | 2004-205928 A | 7/2004 |
| JP | 2004-302225 | 10/2004 |
| JP | 2005-242319 | 9/2005 |

OTHER PUBLICATIONS

English machine translation of Japanese Publication No. 2005-242319.*

* cited by examiner

*Primary Examiner* — Derek S Chapel
(74) *Attorney, Agent, or Firm* — Pearne & Gordon LLP

(57) ABSTRACT

A lens unit including a first lens including a first lens section having a first optical axis along which light passes, and a second lens. The second lens includes a second lens section having a second optical axis along which light passes, and a flange provided at the outer circumferential part of the second lens section and having a surface opposed to the first lens, and a tubular section extending from the flange in the direction of the second optical axis and having an inner side face opposed to the second lens section. The first lens is fitted in the tubular section and in contact with the inner side face of the tubular section of the second lens. The tubular section of the second lens has a plurality of protrusions protruding in the direction of the second optical axis and a plurality of valleys provided between the protrusions.

19 Claims, 4 Drawing Sheets

CAMERA LENS UNIT

TECHNICAL FIELD

The present invention relates to a camera lens unit including plural lenses and used in a camera device.

BACKGROUND ART

Small digital camera devices, such as digital cameras and portable telephones with camera have been recently used. According to the decreasing of the sizes and high image quality of the digital camera devices, camera lens units including plural lenses, having short optical axes, and being applicable to high image quality are used in these digital camera devices.

A conventional camera lens unit including plural lenses is disclosed in Japanese Patent Laid-Open Publication No. 2004-302225. These lenses face each other. Each of the lenses has a lens section as an optical system and a flange which is provided at an outer circumference of the lens section for positioning and holding the lens. The flange is held with a lens holder. The lenses are positioned with respect to each other while flanges thereof contacting each other.

The camera lens unit receives not only light for forming an image on an image sensor but also unnecessary light. The unnecessary light, upon reflecting diffusely in a lens holder, may enter into the image sensor and produce flare on a taken image. In this conventional lens unit, light may reflect diffusely at the flanges contacting each other. In order to prevent the diffuse reflection, a light-shield sheet is provided between the flanges of the lenses.

One of the lenses has a cylindrical section extending from the flange thereof along an optical axis, and another of the lenses is engaged with the cylindrical section, so that the center of each of the lenses can be positioned regardless of the lens holder.

The conventional lens unit may produce the flare due to the diffuse reflection of the unnecessary light at a surface on which the lenses contact each other.

SUMMARY OF INVENTION

A camera lens unit includes a first lens including a first lens section having a first optical axis along which light runs, and a second lens. The second lens includes a second lens section having a second optical axis along which the light runs, a flange provided on an outer circumference of the second lens and having a surface facing the first lens, and a cylindrical section having an inner circumference extending from the flange along the second optical axis. The inner circumference of the cylindrical section faces the second lens section. The first lens contacts the inner circumference of the cylindrical section of the second lens and is engaged into the cylindrical section. The cylindrical section of the second lens includes plural protrusions protruding along the second optical axis, such that plural crenels are provided between the protrusions and have heights along the second optical axis lower than the protrusions.

The camera lens unit prevents diffuse reflection caused by unnecessary incident light.

REFERENCE NUMERALS

1 First Lens
2A Second Lens
3 First Lens Section
4 Flange
5 Cylindrical Section
6 Second Lens Section
7 Flange
8 Protrusion
14 Light Shield Sheet (Light Shield)
15 Light Shield Board
16 First Annular Section
17 Second Annular Section
18 Joint
20 Lens Holder
21 Hole
22 Notch
23 Crenel
102A Lens (Second Lens)
108 Cylindrical Section
208 Protrusion

DESCRIPTION OF THE PREFERRED EMBODIMENT

Figure 1:
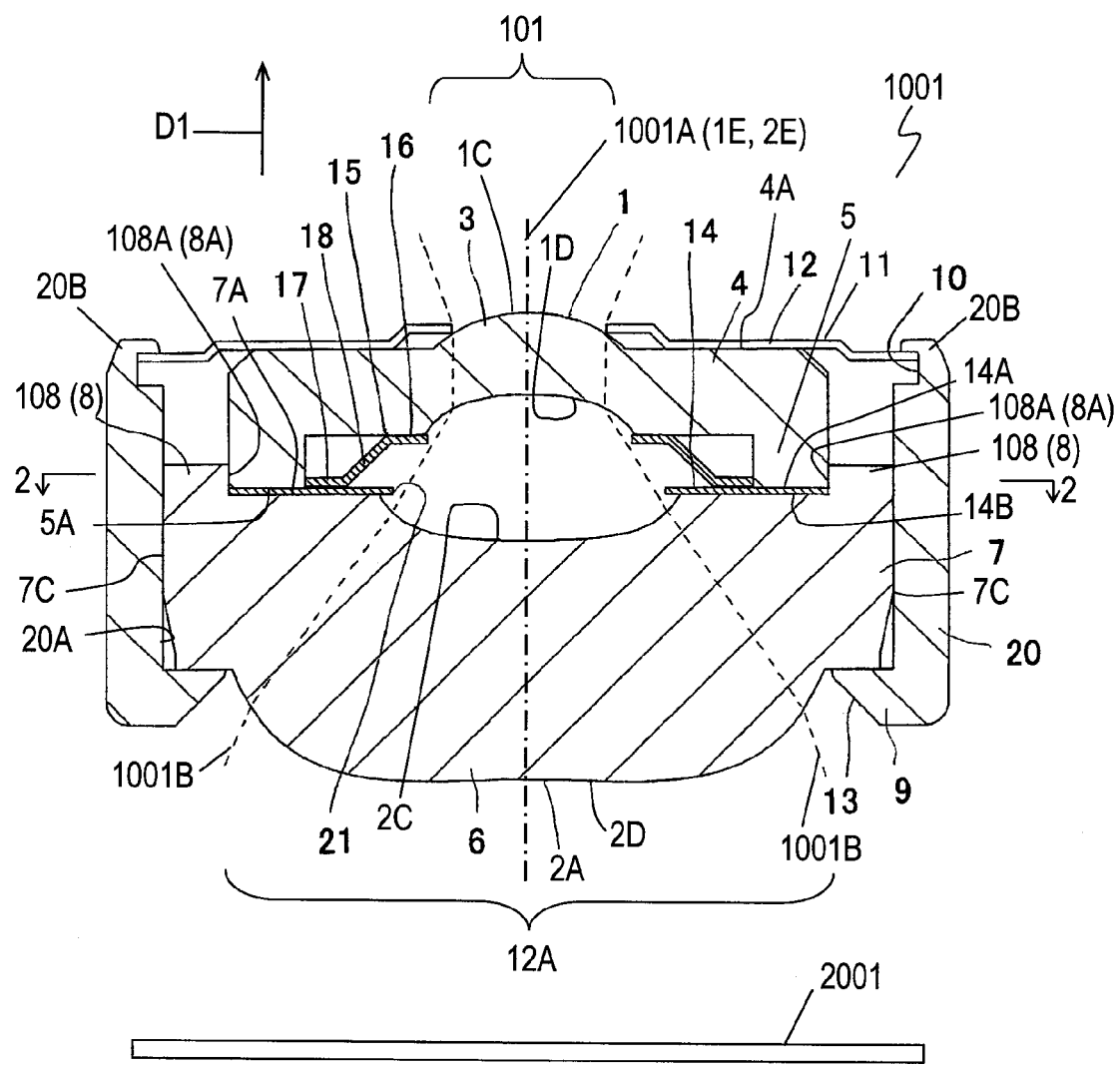
FIG. 1 is a sectional view of a camera lens unit in accordance with an exemplary embodiment of the present invention.
Figure 2:
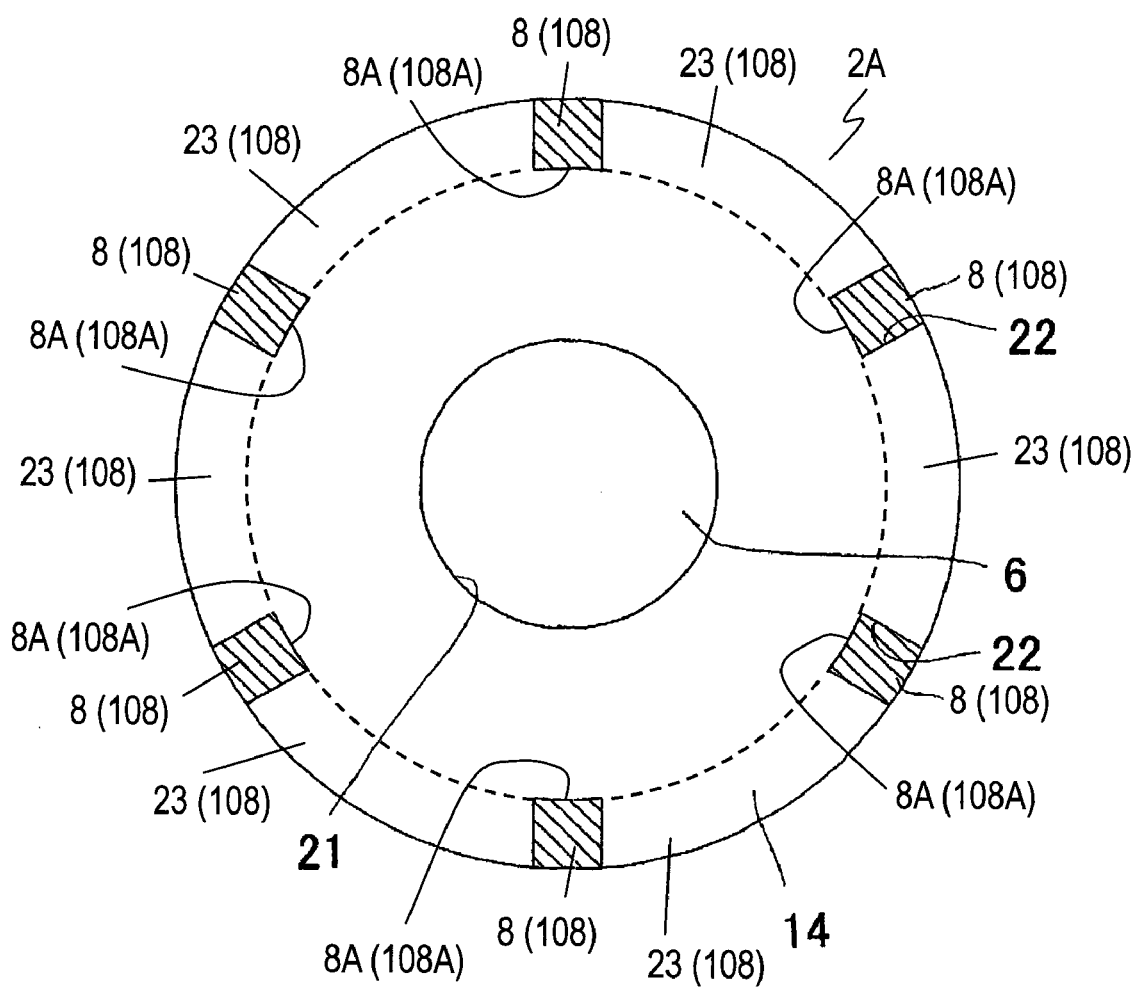
FIG. 2 is a sectional view of the camera lens unit at line 2-2 shown in FIG. 1.
Figure 3A:
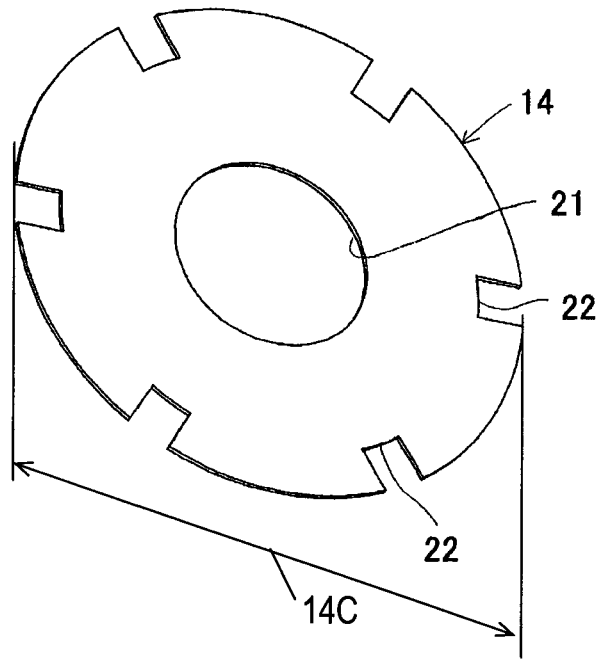
FIG. 3A is a perspective view of a light shield of the lens unit in accordance with the embodiment.
Figure 3B:
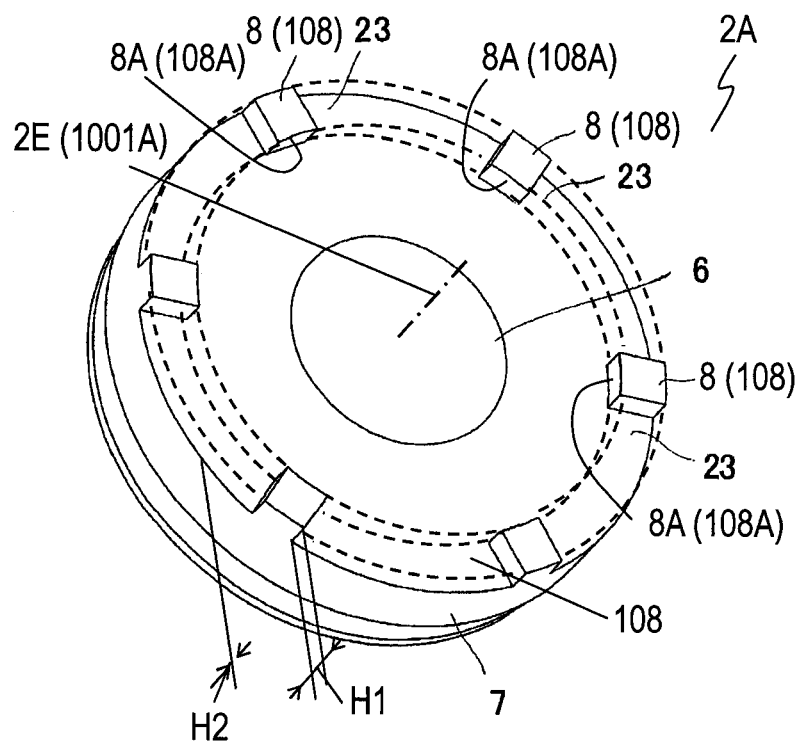
FIG. 3B is a perspective view of a second lens of the lens unit in accordance with the embodiment.

FIG. 1 is a sectional view of camera lens unit 1001 in accordance with an exemplary embodiment of the present invention. FIG. 2 is a sectional view of lens unit 1001 at line 2-2 shown in FIG. 1. FIGS. 3A and 3B are perspective views of light shield sheet 14 as a light shield and second lens 2A of lens unit 1001. Lens unit 1001 includes first lens 1 and second lens 2A located in this order from an object along direction D1. Lens unit 1001 has optical axis 1001A extending through these lenses.

First lens 1 includes first lens section 3, flange 4, and cylindrical section 5. First lens section 3 is placed at center portion 101 through which optical axis 1001A extends. Flange 4 is provided at an outer circumference of first lens section 3. Cylindrical section 5 extends in direction opposite to direction D1, i.e., extends from an outer circumference of flange 4 toward an imaging surface 2001. First lens section 3, flange 4, and cylindrical section 5 are unitarily formed together as first lens 1 made of light-transmittable material, such as glass or resin. First lens 3 through which optical axis 1001A extends has first optical axis 1E coinciding with optical axis 1001A, and functions as an optical system for transmitting light from the object to imaging surface 2001.

Second lens 2A includes second lens section 6 placed at center portion 12A through which the optical axis extends, flange 7 provided on an outer circumference of second lens section 6, and cylindrical section 108 extending from the outer circumference in direction D1. Second lens 6, flange 7, and cylindrical section 108 are unitarily formed together as second lens 2A made of light-transmittable material, such as glass or resin. Second lens section 6 through which optical axis 1001A extends has second optical axis 2E coinciding with optical axis 1001A and functions as the optical system for transmitting the light from the object to imaging surface 2001. Cylindrical section 108 is cut out to have a comb-tooth shape having its height in a direction along optical axis 1001A changing at six positions at constant intervals along the circumference direction of the cylindrical section. Crenels 23 are provided between respective ones of protrusions 8 adjacent to each other. Height H1 of protrusions 8 in the direction of optical axis 1001A (2E) is larger than height H2 of crenels 23 in the direction of optical axis 1001A (2E). Height H2 of lens unit 1001 shown in FIGS. 1 to 3B is zero.

Cylindrical section 108 has inner wall 108A extending along second optical axis 2E and facing second lens section 6. First lens 1 securely contacts inner wall 108A and engaged into cylindrical section 108.

According to this embodiment, surface 1C of first lens section 3 is convex toward the object, and surface 1D is concave from imaging surface 2001. Surface 2C of second lens section 6 is convex from the object, and surface 2D is convex toward imaging surface 2001. Lens sections 3 and 6 may have any shapes according to their optical design.

While second optical axis 2E of second lens 2A coincides with first optical axis 1E of first lens 1, flange 4 and cylindrical section 5 of first lens 1 is engaged into cylindrical section 108 of second lens 2A. Flange 7 of second lens 2A has top surface 7A facing first lens 1. Light shield sheet 14, the light shield, has surface 14A and surface 14B opposite to surface 14A. Light shield sheet 14 is placed on top surface 7A of flange 7, so that surface 14A of sheet 14 contacts top surface 7A of flange 7. End surface 5A of cylindrical section 5 of first lens 1 faces imaging surface 2001 and contacts surface 14B of light shield sheet 14. In other words, light shield sheet 14 is placed between end surface 5A of cylindrical section 5 of first lens 1 and top surface 7A of flange 7 of second lens 2A.

Light shield sheet 14 is made of resin, such as polyethylene telephthalate (PET), in black color, and has an annular shape. Outer diameter 14C of sheet 14 is substantially identical to the outer diameter of flange 7 facing the object. Sheet 14 has six notches 22 provided at its outer circumference into which protrusions 8 of second lens 2A are inserted. Hole 21 provided in the center of sheet 14 has an area such that sheet 14 does not block light path 1001B through which the light from the object runs through the optical systems (lens sections 3 and 6) of lenses 1 and 2A. Light shield sheet 14 may function as an aperture designed with the optical system. Sheet 14 covers top surface 7A of flange 7 and crenels 23 provided between protrusions 8 of cylindrical section 108, thereby blocking the light.

Lens unit 1001 includes light shield board 15 placed between lens 1 and lens 2A. Light shield board 15 has first annular section 16 contacting surface 1D of first lens 1, second annular section 17 contacting surface 14A of light shield sheet 14, and joint 18 coupling an inner circumference of first annular section 16 to an outer circumference of second annular section 17. Light shield board 15 blocks unnecessary incident light entering into lens unit 1001 securely, thereby preventing diffuse reflection of the incident light. Lens unit 1001 is held with an inner wall of lens holder 20.

Lens holder 20 includes flange 9. Flange 9 extends from the bottom which directs toward imaging surface 2001 to the inside along the radial direction. Recess 10 is provided in the inner wall near the top end directing toward the object, so that the inner diameter is large at recess 10. Outer circumference 7C of flange 7 securely contacts inner wall 20A of lens holder 20. Flange 7 of second lens 2A contacts the top surface of flange 9 of lens holder 20 facing towards the object. This structure allows lens holder 20 to accommodate second lens 2A while the center axis of lens holder 20 coincides with second optical axis 2E of second lens 2A.

Aperture 11 including annular section 12 is placed on surface 1C of first lens 1 facing toward the object. The outer circumference of annular section 12 bent inside toward imaging surface 2001, and the inner circumference thereof is bent outside toward the object. Aperture 11 is engaged into recess 10 provided near the top end of lens holder 20, so that annular section 12 securely contacts top surface 4A of flange 4 of first lens 1. Energy, such as ultrasonic wave energy, is applied to top end 20B so that top end 20B can be softened and squashed, and aperture 11 is fixed to lens holder 20 together with first lens 1 and second lens 2A.

Flange 9 of lens holder 20 has flaring section 13 having an inner wall flaring toward imaging surface 2001. Flaring section 13 prevents light coming from second lens 2A from diffusely reflecting on the inner wall of flange 9.

Lens unit 1001 together with lens holder 20 is engaged into a lens-barrel, and are placed on an image sensor, such as a CCD or a CMOS. Light running through lens unit 1001 forms an image on a light receiving section of the image sensor, and the image is then converted into electronic data.

Top surface 7A of flange 7 of second lens 2A is flush with crenels 23 provided between protrusions 8 of cylindrical section 108. This structure allows single light shield sheet 14 to block the light between lens 1 and lens 2A, hence simplifying processes of manufacturing lens unit 1001 and reducing its cost. Top surface 7A may not be necessarily flush with crenels 23.

Figure 4:
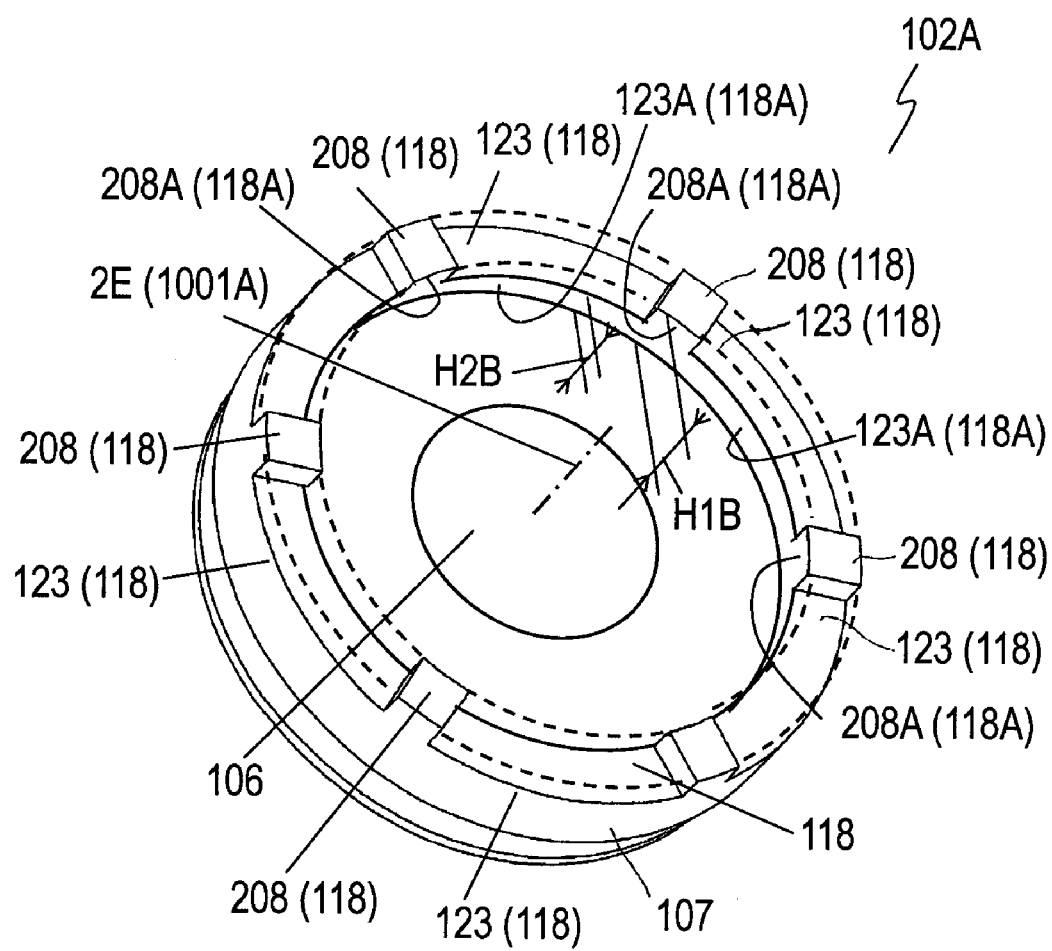
FIG. 4 is a perspective view of another second lens of the lens unit in accordance with the embodiment.

FIG. 4 is a perspective view of another second lens 102A of lens unit 1001. Lens 102A includes lens section 106 at the center portion through which optical axis 1001A runs, flange 107 provided on an outer circumference of lens section 106, and cylindrical section 118 extending from an outer circumference of flange 107 along direction D1. Lens section 106, flange 107, and cylindrical section 118 are unitarily formed together as lens 102A made of light-transmittable material, such as glass or resin. Lens section 106 through which optical axis 1001A runs has second optical axis 2E coinciding with optical axis 1001A, and functions as an optical system transmitting the light from the object to imaging surface 2001. Cylindrical section 118 has a height changing at six positions apart at constant intervals along the circumferential direction, that is, is cut out to have a comb tooth shape having plural protrusions 208. Crenels 208 are provided between respective ones of protrusions 208 adjacent to each other. Height H1 of protrusions 208 along optical axis 1001A (2E) is larger than height H2B of crenels 123 along optical axis 1001A (2E).

Cylindrical section 118 has inner wall 118A extending from flange 107 facing lens section 106 along second optical axis 2E. That is, protrusions 208 and crenels 123 have inner walls 208A and inner walls 123A facing lens section 106, respectively. First lens 1 securely contacts another second lens 102A at inner wall 118A of cylindrical section 118 of lens 102A. That is, first lens 1 securely contacts inner wall 208A of protrusions 208 and inner wall 123A of crenels 123, so that lens 1 is engaged into cylindrical section 118.

The lens unit including second lens 102A instead of second lens 2A has cylindrical section 118 cut out to have a comb tooth shape along the circumferential direction, thus having protrusions 208. A small contacting area is provided between the outer circumference of first lens 1 and inner wall 208A of protrusions 208 of lens 102A. This structure reduces diffuse reflection caused by unnecessary incident light into the lens unit. As a result, the structure having second lens 102A reduces diffuse reflection caused by unnecessary incident light into the lens unit, accordingly providing a clear image.

Lens unit 1001 in accordance with this embodiment is not limited to that discussed above. Lens unit 1001 is applicable to any application. For instance, in lens unit 1001 in accordance with this embodiment, first optical axis 1E of first lens 1 coincides with second optical axis 2E, and coincides with optical axis 1001A of lens unit 1001. However, these optical axes may not necessarily coincide with each other.

The number of the lenses may be three or more. Cylindrical sections 108 (protrusions 8 and 208) are provided at the interface between the lenses, providing the same effects.

The size and intervals of protrusions 8 along the circumferential direction may be changed appropriately.

INDUSTRIAL APPLICABILITY

A camera lens unit according to the present invention reliably prevents diffuse reflection caused by unnecessary incident light, thus being applicable for a camera lens unit including plural lenses.

The invention claimed is:

1. A camera lens unit comprising:
a first lens including
a first lens section having a first optical axis along which light runs,
a first flange provided on an outer circumference of the first lens section,
a first cylindrical section extending from the first flange along the first optical axis; and
a second lens including
a second lens section having a second optical axis along which the light runs,
a second flange provided on an outer circumference of the second lens section and having a surface facing the first lens, and
a second cylindrical section having an inner circumference extending from the second flange along the second optical axis, the inner circumference of the second cylindrical section facing the first lens,
wherein, within a range between the second flange and a top end of the second cylindrical section, an outermost circumference of the first lens contacts the inner circumference of the second cylindrical section and is engaged into the second cylindrical section,
wherein the second cylindrical section includes a plurality of protrusions protruding along the second optical axis, such that a plurality of crenels are provided between the protrusions and have heights along the second optical axis lower than the protrusions, and
wherein a light shield sheet is located on the surface of the second flange and on the plurality of crenels of the second cylindrical section, wherein the light shield sheet does not extend along the second optical axis as high as the protrusions,
wherein the first cylindrical section is remotely located from the first lens section and extends toward the second lens,
wherein the second cylindrical section is remotely located from the second lens section and extends toward the first lens,
wherein the first cylindrical section contacts the inner circumference of the second cylindrical section so that the first lens is engaged into the second cylindrical section,
wherein a combined width of the protrusions defined by a circumferential direction of the cylindrical section is less than a combined width of the crenels.

2. The camera lens unit of claim 1, wherein the surface of the second flange is flush with the crenels of the second cylindrical section.

3. The camera lens unit of claim 1, wherein the second lens section, the second flange and the second cylindrical section are unitary formed.

4. The camera lens unit of claim 1, wherein the first optical axis coincides with the second optical axis.

5. The camera lens unit of claim 1, wherein the protrusions have a comb-tooth shape.

6. The camera lens unit of claim 1, wherein the protrusions comprise more than two protrusions.

7. The camera lens unit of claim 1, wherein the protrusions comprise six protrusions.

8. The camera lens unit of claim 1, wherein the protrusions are arranged radially around the second optical axis.

9. The camera lens unit of claim 1, wherein the inner wall of each of the protrusions extends in a direction of the second optical axis.

10. The camera lens unit of claim 1, wherein the light shield sheet has an annular shape.

11. A camera device comprising:
the camera lens unit of claim 1; and
an imaging surface to which light from an object is transmitted through the camera lens unit.

12. A digital camera comprising:
the camera lens unit of claim 1; and
an imaging surface to which light from an object is transmitted through the camera lens unit.

13. The camera lens unit of claim 1, wherein any portion of the first lens is not located above each of the plurality of crenels.

14. The camera lens unit of claim 1 further comprising a light shield board between the first lens and the second lens,
wherein the light shield board has a first annular section, a second annular section and a joint coupling an inner circumference of the first annular section to an outer circumference of the second annular section,
wherein the first annular section contacts a surface of the light shield sheet which faces to the first flange, and the second annular section contacts a surface of the first flange which faces with the light shield sheet.

15. The camera lens unit of claim 1,
wherein the first lens is not provided above the second cylindrical section.

16. The camera lens unit of claim 1,
wherein the light shield sheet has notches having a combined width less than an outer circumference of an unnotched portion of the light shield sheet.

17. A camera lens unit comprising:
a first lens including
a first lens section having a first optical axis along which light runs,
a first flange provided on an outer circumference of the first lens section,
a first cylindrical section extending from the first flange along the first optical axis; and
a second lens including
a second lens section having a second optical axis along which the light runs,
a second flange provided on an outer circumference of the second lens section and having a surface facing the first lens, and
a second cylindrical section having an inner circumference extending from the second flange along the second optical axis, the inner circumference of the second cylindrical section facing the first lens section, wherein, within a range between the second flange and a top end of the second cylindrical section, an outermost circumference of the first lens contacts the inner circumference of the second cylindrical section and is engaged into the second cylindrical section, wherein the second cylindrical section includes a plurality of protrusions protruding along the second optical axis, such that a plurality of crenels are provided between the protrusions and have heights along the second optical axis lower than the protrusions, and wherein the first cylindrical section is remotely located from the first lens section and extends toward the second lens, wherein the second cylindrical section is remotely located from the second lens section and extends toward the first lens, wherein the first cylindrical section contacts the inner circumference of the second cylindrical section so that the first lens is engaged into the second cylindrical section, wherein a combined width of the protrusions defined by a circumferential direction of the cylindrical section is less than a combined width of the crenels.

18. The camera lens unit of claim 17 further comprising a light shield board between the first lens and the second lens, wherein the light shield board has a first annular section, a second annular section and a joint coupling an inner circumference of the first annular section to an outer circumference of the second annular section, wherein the first annular section contacts a surface of the light shield sheet which faces to the first flange, and the second annular section contacts a surface of the first flange which faces with the light shield sheet.

19. The camera lens unit of claim 17, wherein the first lens is not provided above the second cylindrical section.

* * * * *

UNITED STATES PATENT AND TRADEMARK OFFICE
CERTIFICATE OF CORRECTION

| | | |
|---|---|---|
| PATENT NO. | : 8,070,304 B2 | Page 1 of 1 |
| APPLICATION NO. | : 11/813462 | |
| DATED | : December 6, 2011 | |
| INVENTOR(S) | : Kouichiro Matsuoka et al. | |

It is certified that error appears in the above-identified patent and that said Letters Patent is hereby corrected as shown below:

In column 6, line 17 please delete "wherein the inner" and instead insert -- wherein an inner --

In column 6, lines 37 & 38 should read: circumference of the second annular section to an outer circumference of the first annular section.

In column 6, line 39 please delete "the first annular" and instead insert -- the second annular --

In column 6, line 41 please delete the first word "second" and instead insert -- first --

In column 8, lines 8 & 9 should read: circumference of the second annular section to an outer circumference of the first annular section.

In column 8, line 10 please delete "the first annular" and instead insert -- the second annular --

In column 8, line 12 please delete the first word "second" and instead insert -- first --

Signed and Sealed this
Eighth Day of May, 2012

David J. Kappos
*Director of the United States Patent and Trademark Office*